March 7, 1967     F. J. LUKETA     3,307,284
METHOD AND APPARATUS FOR DRUM TRAWLING
Original Filed April 15, 1965     5 Sheets-Sheet 1
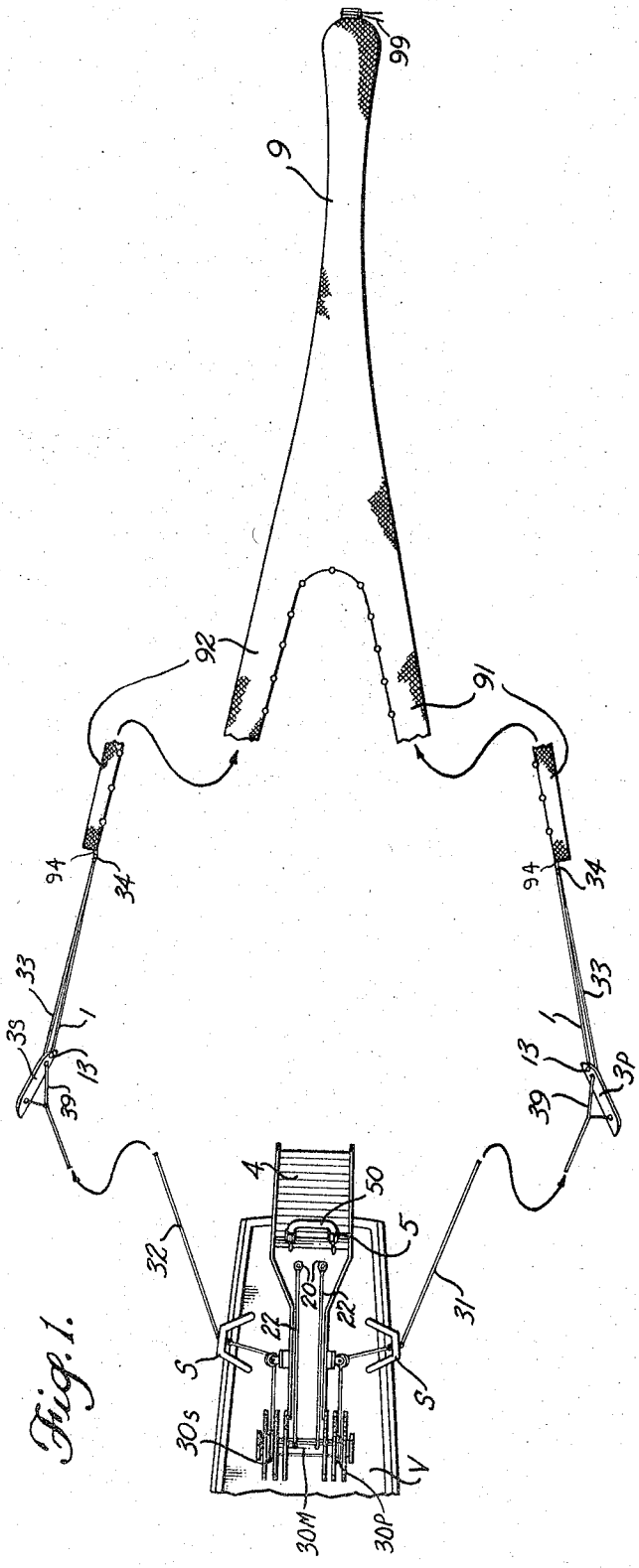
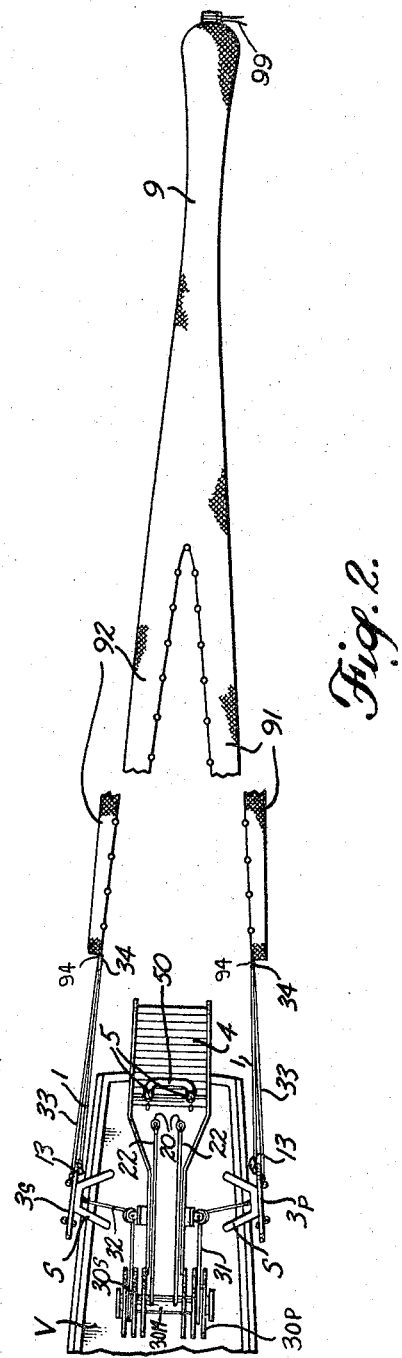
INVENTOR.
FRANK J. LUKETA
BY
ATTORNEYS

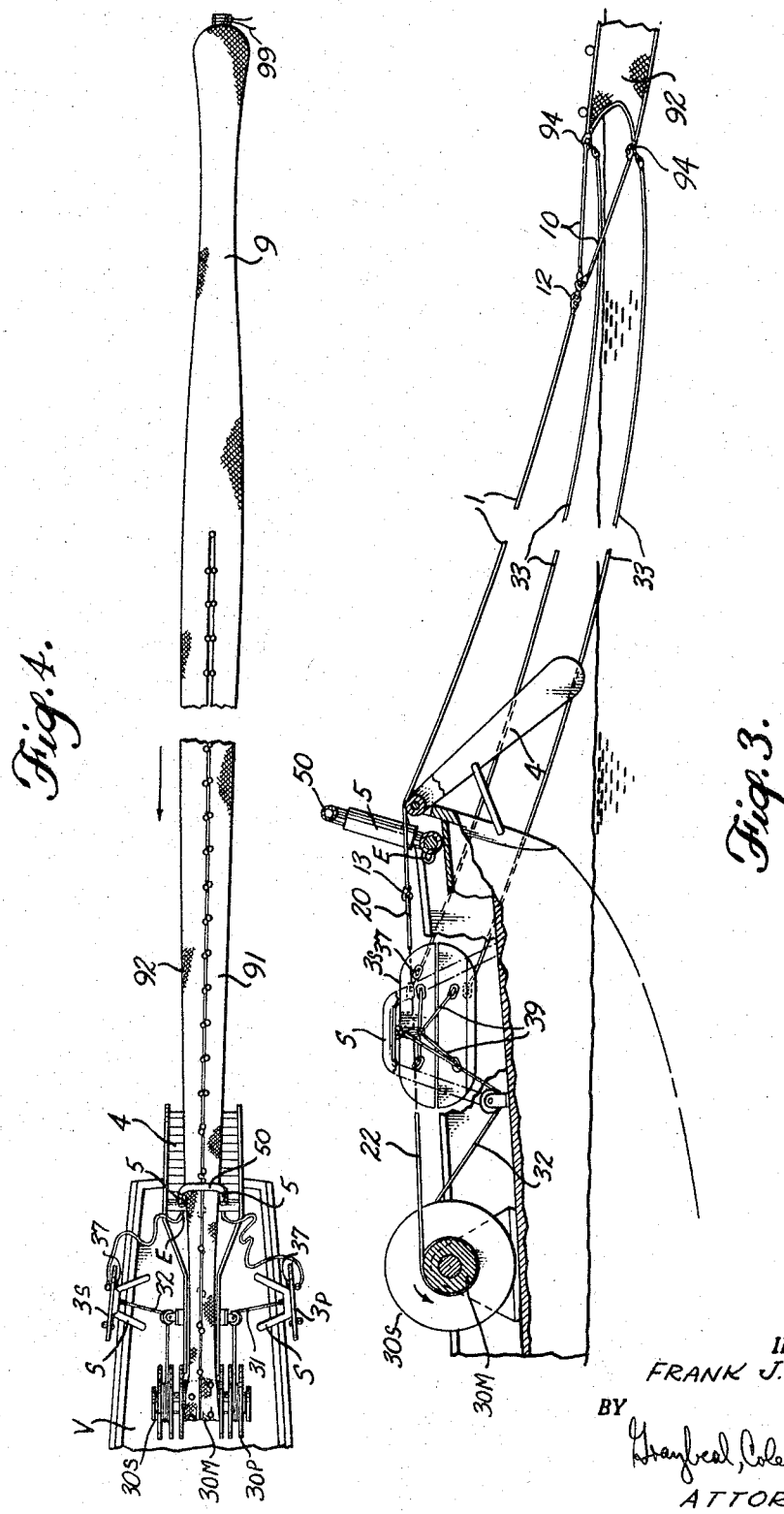

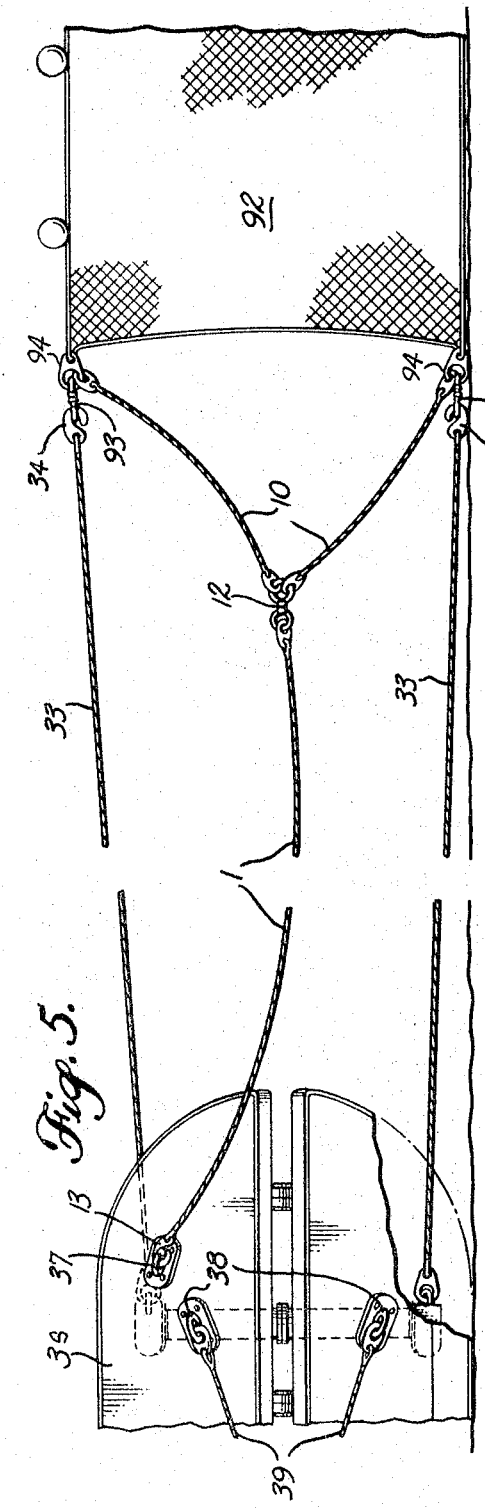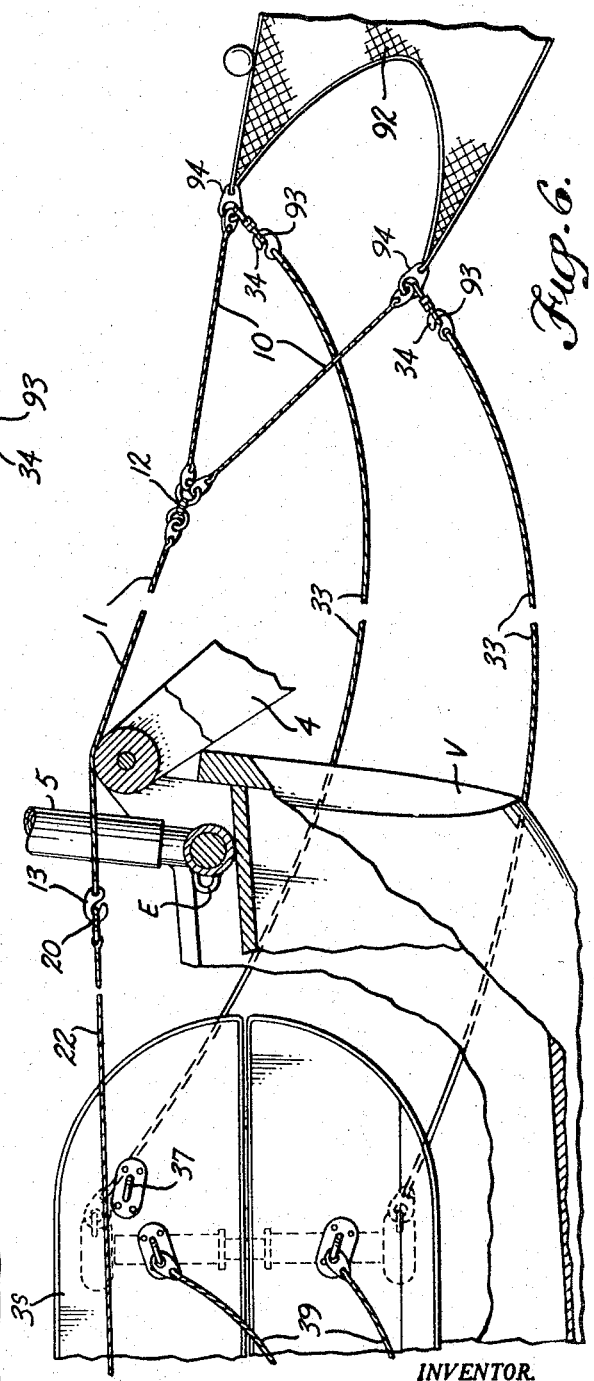

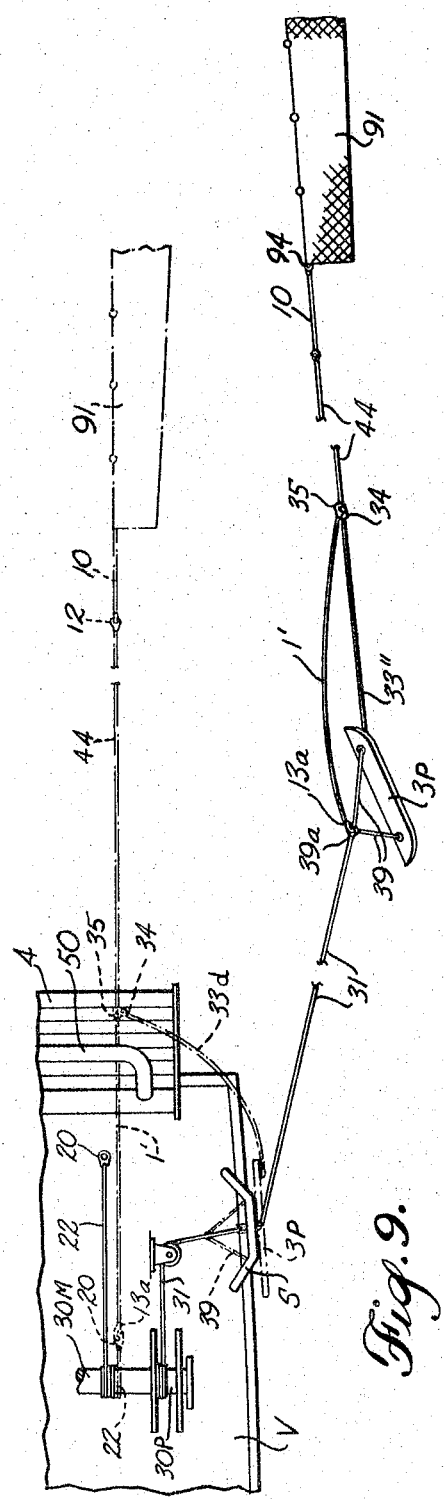
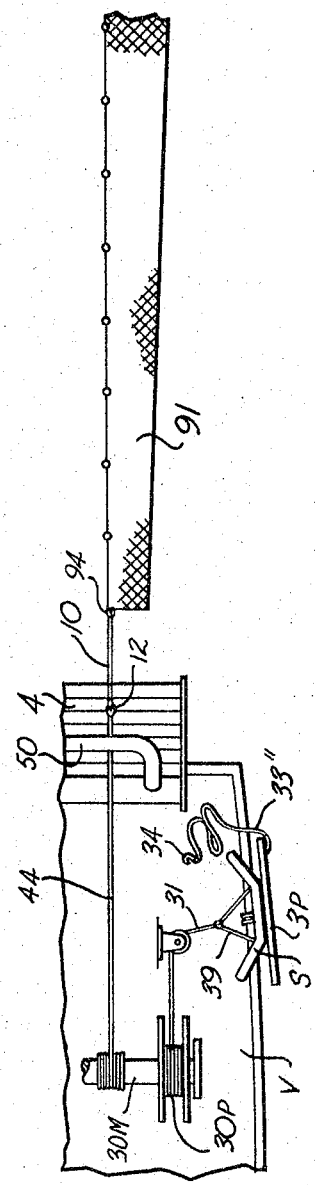

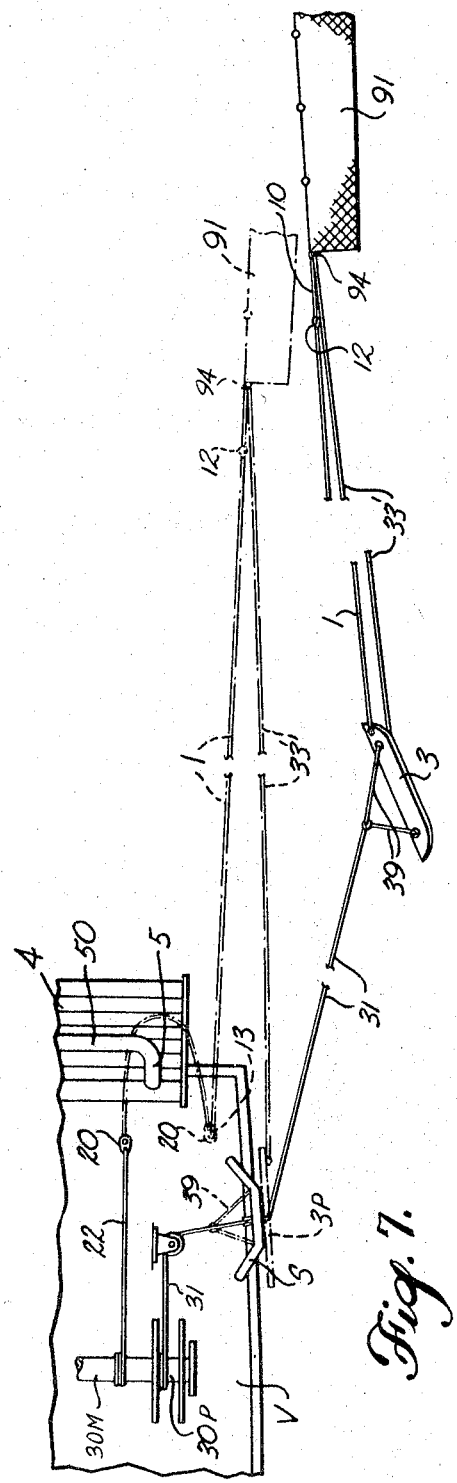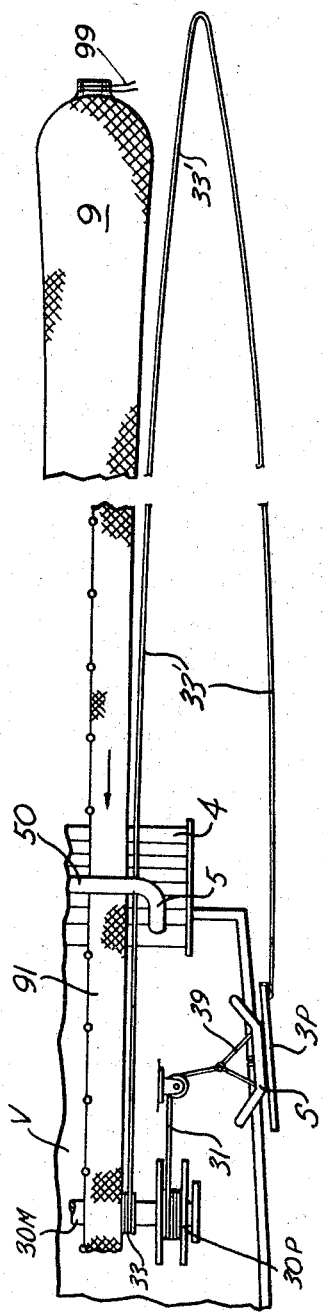

United States Patent Office 3,307,284
Patented Mar. 7, 1967

3,307,284
METHOD AND APPARATUS FOR
DRUM TRAWLING
Frank J. Luketa, 5567 Greenwood Ave. N.,
Seattle, Wash. 98103
Continuation of application Ser. No. 448,442, Apr. 15,
1965. This application Dec. 13, 1965, Ser. No. 517,175
10 Claims. (Cl. 43—4.5)

This application is a continuation of my copending application Serial No. 448,442, entitled, Method and Apparatus for Drum Trawling, filed April 15, 1965, which is in turn a continuation-in-part of copending application Serial No. 338,256, filed January 16, 1964, and entitled, Drum Trawling Apparatus and Method, which is in turn a continuation of now abandoned application Serial No. 269,691, filed April 1, 1963, and entitled, Drum Trawling Method and Apparatus, which is in turn a continuation of now abandoned application Serial No. 132,234, filed August 17, 1961, and entitled, Drum Trawling Gear and Method, which latter application is in turn a continuation-in-part of now abandoned application Serial No. 570,771, filed March 12, 1956, entitled, Trawl Net Hauling Gear.

A conventional or so-called "standard" trawl net includes an elongated codend pursed at its after end and opening forwardly at its throat, and short wings at each side of and directed forwardly from its throat, all of netting. In a commonly used rig a set of lines extends aft and downwardly over each of the opposite side bulwarks or rails near the stern of the towing vessel, or trawler, to each wing, during trawling. Doors (also known as paravanes) are connected in each such set of lines, ahead of the wings, their purpose being to spread the wings widely apart by water reaction. Trawling operations are either to catch bottom fish, in which case the doors and the net drag along the bottom, or to catch fish in midwater, in which case the depth to which the doors are submerged is controlled by the length of line from the trawler to the door and by the speed of the trawler. The operation which will be described herein is the bottom trawling operation, but the present invention will apply equally well to either such operation.

When using "standard" nets much of the stress of dragging the net and its catch, and of hauling the same to the trawler, the trawler meanwhile being under way, is borne by the wings. These are heavily stressed, and must be of large, strong twine, with the numerous meshes oriented to close down under stress. This has at least one major undesirable result. The heavy twine and the closely contracted mesh squares impede forward progress, or in other words increase drag to the detriment of bottom area coverage and therefore fish catching.

Such "standard" nets are conventionally hauled in three stages. In the first stage the towing warps that extend from the trawler aft and downwardly over the respective side rails from warp winch means on deck to the doors at the bottom are hauled in until the doors can be secured at the opposite rails. The vessel for several important reasons must be underway while hauling the net in. This leaves the wings and net body trailing aft and downwardly from the doors, with the net bosoms that join the after ends of the wings and define the transverse top and bottom of the throat usually hanging downwardly below the keel level, aft of the stern of the trawler. The wings are commonly connected by long sweep lines to the doors, and since the doors cannot be hauled farther, there must be some other provision for completing the second stage of hauling. The second stage of the conventional hauling-in operation employs a technique and gear devised by one Vigneron, and shown by way of example in U.S. Patent No. 1,601,893, or in British Patent No. 232,914. A still further variation in conventional practice is disclosed in the Danielou U.S. Patent No. 1,553,754. All these prior patents are assigned to Vigneron, Dahl & Co., and are often referred to as V–D patents. This gear and techniques have been in substantially world-wide use for more than thirty years.

In this second stage of the V–D technique the sweep lines (which are heavy cables extending aft from each crow-foot to the corresponding net wing and are usually between fifteen to seventy-five fathoms in length), must be hauled in after the doors have been hauled in and secured at the opposite rails of the trawler. As suggested by the V–D patents, what are termed "pennant" lines or "dandy" lines are used for connection between the towing warps ahead of the doors and the lines led aft of the doors to the wings, and serve when the net is hauled as the means for disconnecting the sweep lines and towing wrap from the doors. Sometimes the lines thus constituted, which includes the pennant lines, are intended to run through the stopper eye of the crow-foot, and sometimes they are intended to be free of the doors, but still to extend downwardly at opposite sides of the trawler. The whole purpose of the V–D technique is to haul in the sweep line so the wings of the net are accessible for strapping. In the V–D rigging the pennant lines or dandy lines are relatively quite short, as compared with the lazy lines of the present invention.

Strapping of the net wings, according to the V–D technique involves preliminarily bringing the now accessible forward ends of the two wings together by connecting them to a powered boom fall line by means of a special bridle, and hauling these ends upwardly at a steep angle, the trawler at the same time being maneuvered to bring both such wings, thus suspended, to one side rail amidships of the trawler. With the net wings thus suspended and with the trawler stopped dead in the water, the strapping operation begins. The net wings are choked at rail level by a special strap that is passed about the wings, a rather dangerous operation in a vessel rolling in heavy seas, and such strap is secured to a second boom fall line and hauled up to its boom block. Meanwhile the wing ends are lowered and hand-hauled (an operation usually requiring three men) to the stern and there stowed. This strapping and hauling is continued by a succession of steps, continuing usually until the after end of the codend is accessible and can be lifted onto the deck, and the catch spilled from the net by releasing the codened purse line.

Strapping is a tedious, laborious, and time-consuming operation under the best of circumstances. In heavy weather it involves quite appreciable risk, as crew members lean over the rail to pass the successive straps around the net and haul back the heavy, violently swinging net as it is successively lowered by the fall lines. This is another reason the wings of a "standard" net are kept short in length, even though longer wings more widely spread would sweep in more fish. It is also this danger to the crew that causes vessels using the V–D technique to cease fishing during very heavy weather. Strapping also exposes the catch longer to predatory fish in some fisheries, and precludes the net being reset quickly. It also often permits the escape of some of the catch from the mouth of the trawl, a source of loss that is often serious.

The present invention differs from all such prior hauling methods and gear in that strapping of the net wings is wholly eliminated, and the net wings and net can be hauled in with fewer personnel and in weather so rough that strapping of the net wing would be impossible. In typical practice of the invention, the net wings and net are hauled in between laterally spaced upright guides (although the guides are not strictly necessary), through the medium of "lazy"' lines which are slack during trawling and which connect at their after ends to the forward ends of the net wings directly or to juncture points along the interposed sweep lines that run to the net wings, which lazy lines are of a length, in constrast to *short* "pennant" lines of the V-D gear, and are so rigged, that when the doors are hauled in close to the stanchions the forward ends of the lazy lines are accessible and can be disconnected but their after ends are so far off board the trawler that when their disconnected forward ends are connected to the net winch means, either directly or in conjunction with winch attached hauling lines and power is applied to the net winch means, the entire stress of the net wings and codend is assumed by the lazy lines rather than the forward portions of the sweep lines, and the latter lines become slack so that the load of the net wings and net becomes wholly disassociated from the doors and at least the forward portions of the sweep lines. The second stage of hauling of the net then comprises merely the reeling in of the lazy lines, the net wings, and even the codend of the net if desired, by and onto a powered drum.

As will be observed, it is a fundamental feature of the invention that lazy lines remain secured at their after ends to the net wings or to the net sweep lines at juncture points sufficiently far behind the doors and off board the trawler so that when the doors are in the vicinity of the door stanchion the forward ends of the lazy lines can be disconnected and can serve as at least a portion of the hauling line means which, when tensioned, causes a slackening of at least a portion of the sweep lines and disassociation thereof from the net load, whereupon the net wings and net can be reeled in on the net winch means without further interruption, and without any further manual manipulation of the lines. Such simple and uninterrupted hauling in of the net wings and net by a single powered net winch means and without strapping, is the underlying advantage characterizing this invention.

In addition to this underlying advantage, the drum trawling method enables the use of a trawl net having large, unstressed curtains such as is disclosed in my pending U.S. application 508,633 entitled, Trawl Nets, filed October 22, 1965 and in my U.S. Reissue Pat. No. 25,748, granted March 23, 1965. Such trawl net has, in place of stressed wings, unstressed curtains which are a length many times that of the wings of a "standard" net, with their meshes of light twine, with the meshes wide open, hence producing a minimum of drag. These curtains can spread far more widely than can the wings of a "standard" net, and so can sweep far more fish into the net than can a "standard" net. This new net has a free ground line and hanging curtain design which makes this net highly snag-free in use and also makes possible an overhanging or inclined curtain configuration when the net is towed, leading fish into the codend and not permitting them to escape over the curtain lines. However, the curtains of such trawl net cannot be strapped in because the highly-tensioned ground line would slip through the choking strap. Moreover, even if strapping were attempted with this very long curtain type trawl net, the strapping sequence would of necessity be greatly prolonged. In short, the net hauling technique of the present invention, obviating any need for strapping of the wings or curtains of a trawl net, has made possible and realizes its greatest advantages when used with improved and more efficient types of nets.

In practice, the present invention requires the use of at least three separately operable winch means on the deck of the trawler. Two winch means are necessary for the respective towing warps, and constitute a first and a second towing warp winch means. A third winch means which can involve three winch drums operating as a unit, is also required and is herein termed the (net winch means). When there are three such unitized drums making up the net winch means, the outer two of the three drums used for hauling the net receive and wind on the hauling line means and at least a portion of the net wings or curtains and the third, intermediate drum receives the latter part of the wings or curtains, the net body and sometimes the codend. This net winch means arrangement is believed to be distinctive, but the essence of this invention is not so much the distinctive net winch means involved, but the operational steps and sequence which such winch means and the associated lines and rigging permit.

More specifically, the present invention involves the use of any suitable trawl net and the normal set of trawling lines (sometimes herein simply designated as the first set of lines) extending aft from the vessel during trawling, and including port and starboard towing warps are each typically connected in use to at least one sweep line extending aft to each wing or curtain of the net. The trawl doors used in conjunction with such trawling lines may be of any suitable type which serve to laterally spread the sweep lines, and hence the wings of the net.

A distinctive feature of the present invention resides in the provision of a hauling line means (sometimes also designated herein simply as a second set of lines) which during final hauling of the net extends from the trawler to the two net wings, and sometimes includes rearward portions of the sweep lines. In some versions such hauling line means is used only during hauling in of the net, and during their use by-pass the doors to assume the tension once the doors have been hauled close to the vessel and secured if desired. The said first and second sets of lines may be largely or wholly independent, so that the second set may be connected to the net or sweep lines only when the doors have been hauled close, and the first set may then be wholly disconnected after the second set assumes the tension, or there may be parts of one set that function in a dual capacity as part of the other set. Disconnection and connection are not always essential, although this will depend upon the specific rigging and the length relationship of certain lines. Typical relationships, such as shown in the accompanying drawings, include a first set of lines incorporating a towing warp extending aft over the respective rails towards the wings at starboard and at port, from respective first and second towing warp winch means, but terminating at doors attached to their after ends. What are termed door leg lines extend forward from each wing to a connection at each door; each towing warp and connected door legs or lines constitutes such first set of lines. Each second set of lines, in a typical relationship, includes a lazy line, which extends forwardly from a connection or juncture point to the wing or its sweep line that is off board the trawler when the doors are hauled, to a point of securement preferably upon the door, although such lazy line optionally may be secured to the first set of lines near the door. Each lazy line is slack during trawling, but can be disengaged from such forward point of securement when the doors have been hauled to the vessel, then can be led on board the trawler, such as by being led between upright guides at the stern, and engaged with the net winch means either directly or by connection to a winch connected hauling line, to complete the second set of lines. By virtue of the hauling line means of this invention, when this second set of lines is hauled in and is tensioned by the net load, the first set of lines goes slack and is disassociated from and can be disconnected from the net, leaving each door connected to its towing warp and out of the way, so that the net can be hauled in by and reeled upon the net winch means without interruption.

There are many variations in rigging, in location of points of securement and of disconnection, and in lengths and composition of the lines used in each set of lines. Some of these will be explained hereinafter, and others will suggest themselves to those skilled in this art.

The invention has been sufficiently described above that it is believed it will be readily understandable from the accompanying drawings, wherein the invention is shown in certain typical and somewhat variant installations, and from the following specification, wherein like numerals refer to like parts, and wherein:

FIG. 1 is a plan view of the stern of a trawler and illustrating the towed net during trawling, with the gear rigged according to the preferred arrangement. As will be understood, certain distances are so great in this view and in most of the views that is impracticable to show the various elements in precisely the relationships they would occupy.

FIG. 2 is a view similar to FIG. 1, but showing the net in the first stage of being hauled, with the doors having been brought aboard and secured upon stanchions on the trawler, but not yet disconnected from the net's wings.

FIG. 3 is a side elevational view with parts shown in section, corresponding to the views of FIGS. 1 and 2 but illustrating a subsequent stage in the hauling of the net, with winch attached hauling lines connected to the lazy lines and both taking the strain, but showing the door leg lines slack but still connected between the doors and the net.

FIG. 4 is a view similar to FIGS. 1 and 2, but showing a final stage in the hauling of the net, after the hauling and lazy lines have been wound upon the net winch means, and the net is in process of being reeled in upon the same winch means. In said FIG. 4, the door leg lines have been disconnected from the net so that the doors and towing warps are also disconnected from the net.

FIG. 5 is an enlarged elevational view of the starboard gear during trawling operations; corresponding to FIG. 1.

FIG. 6 is a view similar to FIG. 5, but showing the gear during hauling of the net; corresponding to FIG. 3.

FIG. 7 is a plan view of the port half of a modified net and rigging arrangement, the full-line showing illustrating the gear arrangement during trawling, and the dot-dash showing illustrating the transference of strain to the winch attached hauling lines and the lazy lines, which will allow very long door leg lines to go slack; and FIG. 8 is a similar view of a subsequent stage of hauling, showing the slack in the door leg lines being wound in with the net, without disconnection therefrom.

FIG. 9 is a plan view of the port half of a further modified net and rigging arrangement, involving shorter lazy lines, the full showing illustrating the arrangement during trawling and the dot-dash showing illustrating the orientation of the hauling line means when strain is imposed upon the lazy lines.

FIG. 10 is a plan view of the port side of the net and rigging illustrated in FIG. 9, showing the same at the stage of hauling just before the net's wing is hauled aboard.

For the purpose of illustrating the invention and its use, the trawl net is assumed to be of conventional design, including the codend 9 in which the catch is gathered, closed at its after end by the usual purse line 99, and also including respective port and starboard wings 91 and 92. Such a net is towed through the medium of respective port and starboard towing warps 31 and 32, wound upon respective first and second towing warp winch means 30P and 30S aboard the vessel V, and extending aft and outwardly therefrom over the opposite rails to respective doors 3P and 3S. Each door is suitably connected to its respective towing warp, as through respective towing bridles 39. Each such bridle is normally permanently connected to the associated door, as by eyes 38 (FIG. 5) to which the bridle 39 is shackled. As will be understood, the present invention is not concerned with the particular nature or arrangement of the door or the bridle, or other connections thereto.

From each trawl door, the respective door leg lines 33 extend aft. Said lines 33 each usually comprise an upper leg line led to the top of the wing, and a lower leg line led to the bottom of the wing, as shown in FIGS. 3–6. The leg lines 33 constitute in effect the sweep lines, and with associated towing warps make up the first set of lines referred to above. In the form of the invention illustrated in FIGS. 1–6, provision is made for disconnection at the net between leg lines 33 and the associated net wings, such disconnection of the lines 33 (see FIGS. 5 and 6) being by means of the swiveled shackles 93 at the forward tip of the net's wings, and the disconnectible hooks 34 at the after ends of the respective leg lines 33.

The rig shown in FIGS. 1–6 to illustrate the principles this invention includes at each side of the net respective lazy lines 1 which extend from the net wings by way of a bridle 10 at each wing's forward end and a swivel 12, to the associated door, and a hook 13 at the forward end of each lazy line 1, which can be disconnected from eye 37 upon each associated door. The lazy lines 1 are of such length, relative to the associated leg lines 33, that during trawling the lazy line is slack and takes no strain, all strain being imposed upon the leg lines 33. During trawling, in the arrangement according to FIGS. 1–6, the hooks 34 and 13 remain connected, the hooks 34 to the swiveled shackles 93, and the hooks 13 to the eyes 37. The lazy lines 1 need not be connected directly to the net wings as shown in the drawings, and standard net rigs usually have very long sweep lines 44 interposed between the leg lines and the wings.

When the net is to be hauled, the towing warps 31 and 32 are reeled in simultaneously upon the towing warp winch means 30P and 30S until the respective doors 3P and 3S are hauled close to the vessel, where normally they will be hauled aboard and secured to or against stanchions S. In a typical arrangement of this invention, the hook 13 at the forward end of each slack lazy line 1 is disconnected from the eye 37 of its door, and each lazy line is led in between laterally spaced upright guides 5. Each hook 13 is then connected to the eye 20 at the after end of an associated hauling line 22, making up the second set of lines. Now the hauling lines, being wound about the powered net winch means 30M, is taken in, applying strain to the lazy lines, and pulling slack in the sweep lines 33, and orienting the lazy lines and net wings in a substantially straight haul-in path, as shown at FIG. 4. When the hauling has proceeded sufficiently that the hooks 34 at the after end of the door legs have been hauled aboard, these hooks 34 are disconnected from the respective swiveled shackles 93, and the hooks 34 may be stowed in engagement with eyes E (FIGS. 3 and 6) aboard the vessel V. This leaves the first set of lines, including the towing warps 31 and 32, the doors 3P and 3S, and the leg lines 33, completely disconnected from the net and leaves the net connected only to the second set of lines, consisting in this instance of the hauling lines 22 and the lazy lines 1, as shown in FIG. 4. The hauling lines 22 and the lazy lines 1 wind about the drum 30M, and so does at least a portion of the net wings. After the net comes aboard, the catch is dumped on deck in the usual manner, upon releasing the purse line 99 at its after end. When the net is payed out, the leg lines 33 are reconnected at 34 and 93, and the first set of lines reassumes the strain, the lazy lines are disconnected at 20 and reconnected at 37 to disassociate the second set of lines, and the original rigging is restored.

Obviously, the net winch means 30M can be located nearer the stern so that the lazy line hooks 13 could be engaged over the stern directly with the net winch means, upon securement of the doors, in which case no hauling lines 22 as such would be required. The lazy lines 1 then would constitute the entire hauling line means. Conversely, if the net wings are hauled in sufficiently close to the vessel to make the swivels 12 of bridle 10 accessible from the vessel, and the hauling lines 22 are sufficient long, the hauling lines 22 can be connected directly to the respective swivels 12 and the first set of lines let out sufficiently to effect the transfer of tension to the hauling lines 22 and the slackening of the first set of lines so the latter can be disconnected. As will be apparent, in this latter arrangement the hauling lines 22 and bridles 10 constitute the entire hauling line means.

If the leg lines are of great length, relative to the length of the net, it is not necessary to disconnect these leg lines from the net, nor from the associated doors 3P and 3S. FIGS. 7 and 8 illustrate the same general arrangement as in the preceding figures, except that the leg lines 33' are long enough that after connection of the hauling lines 22 to the lazy lines 1 (in the manner shown in FIG. 7 by dot-dash lines), and after the lazy lines 1 and the hauling lines 22 take the strain, the net wings and its leg lines 33' are wound upon the drum 30M (also the codend if desired), with the excess length of the leg lines 33' doubling back, as shown in FIG. 8, and causing no obstruction to the winding in of the net.

A further modified rigging can be used, involving lazy lines 1', shown in FIGS. 9 and 10. During trawling the lazy lines 1' extend with some slack between a connection to the first set of lines ahead of the door, and a connection, also to the first set of lines, substantially aft of the door. For example, the hooks 13a at the forward end of the lazy 1' connect to the eyes 39a at the forward points of the respective towing bridles 39, and the sweep lines 44 are connected to the respective doors through respective leg lines 33'' that are connected permanently to the doors at their respective forward ends. Each of the leg lines 33'' carries a hook 34 engaged with, but disconnectible from, a swivel eye 35, at which point the lazy line 1' and associated sweep line 44 are permanently connected. Thus connected during trawling (and as shown in full lines in FIG. 9), the net is towed through the towing warps 31, 32, the towing bridles 39, the doors 3P and 3S, the leg lines 33'' and the sweep lines 44, the lazy lines 1' in the meanwhile being slack. After the doors have been secured as shown in FIG. 9 by the dot-dash showings, the hooks 13a can be disconnected from the respective eyes 39a, and the lazy lines 1' connected to eye 20 at the ends of respective hauling lines 22. After strain is transferred to the lazy lines 1' and the now-connected hauling lines 22 and slack is pulled in the leg line 33'', as shown in FIG. 9 in dot-dash lines, the hook 34 is disengaged from eye 35, leaving the associated door, and its towing warp 31, and the leg line 33'' disconnected from the net wings and the sweep lines 44 and net connected, through the lazy line 1' to the respective hauling lines 22, ready to be reeled in upon net winch means 30M as before, as shown in FIG. 10. In this arrangement the lines 44 aft of the connection 35 which during trawling constitute part of the first set of lines, during hauling constitute part of the second set.

To facilitate the hauling of the net, it is preferred that a retractable ramp 4 be employed which, during hauling, is inclined aft and downwardly over the stern of the vessel to facilitate hauling on board. Also, because the vessel may slue or yaw around with relation to the direction of the net, it is preferred to employ two upright lateral roller guides 5, sometimes with a connecting overhead bar 50, interconnecting upright guide 5 between which at least the various hauling line means and the net wings pass.

In essence, the two-stage drum trawling technique and apparatus of this invention eliminates the third of strapping stage of the V-D technique by transferring the net load to and hauling in and winding the trawl net onto a single powered net winch means. This achieves considerable labor saving and economic benefit to the trawling industry when using a standard trawl net. But much more importantly, such drum trawling technique has made possible many other trawling inventions such as my above-mentioned curtain trawl net.

While the above discussion and accompanying illustrations relate the present invention particularly to a trawler of the type equipped with winch means disposed with axes transversely of the trawler and with a stern placed ramp and door stanchions placed at the side rails of the trawler substantially forwardly of the ramp, it will also be apparent that other arrangements of these on board equipments are possible, consistent with the basic mode of operation characterizing the present invention. By way of typical further example in this respect, the door stanchions can be place at spaced locations along one side and generally amidships of the trawler, with a ramp directly therebetween, and with the axes of the various winch means arranged longitudinally of the vessel, if desired.

As used herein, the term "codend load" refers to the gravity and water drag load of the codend as it is towed through water, and the weight and drag of the catch, if any, entrapped therein.

As used herein, the term "trawl net assembly" refers to the entire trawl net, and any associated lines which during trawling are stressed and lead forwardly from the net and terminate either at the trawl doors or at the towing warps, and function to interconnect the net with the towing warps and the doors.

As used herein, the term "divergent section" refers to like parts of the trawl net assembly which are stressed and diverge forwardly each from the other during trawling, i.e. the wings and any and all lines led forwardly therefrom which function to interconnect the net with the towing warps and the doors.

As used herein, the term "hauling line means" refers to the lines and associated parts which interconnect the net winch means and the divergent section during the stage of hauling of the net occurring when the codend load is transferred to the net winch means.

As used herein, the term "juncture points" refers to the forwardmost locations on the trawl net assembly which are under tension during both trawling and after the hauling line means assumes the stress of at least the codend load during the hauling of the net.

As used herein, the terms "haul-in path" and "substantially straight haul-in path" refer to the path followed by the hauling line means and the net as they are hauled in by the net winch means 30M. Specifically, in the forms of the invention illustrated, this path is defined by the flanges of the net winch means 30M, the posts 5 and the portion of ramp 4 therebetween, and the trailing condition of the net which occurs as a result of the vessel being underway while the net is hauled. This path can otherwise be described as substantially in-line, vertically considered or as viewed in plan, as shown at FIG. 4.

What is claimed is:

1. A method of hauling a trawl net assembly aboard a trawler, which assembly has at least a codend and a divergent section including wings extending forwardly from said codend, and which is towed during trawling by a set of towing warps extending aft from the trawler to the net, which set of towing warps is provided with trawl doors ahead of the wings to spread the wings divergently as they lead forwardly, by gear aboard the trawler comprising a pair of horizontally spaced apart door stanchions for the said doors, separately operable first and second towing warp winch means for hauling in the towing warps, and a single, separately operable net winch means situated to haul in a hauling line means and at least some of the net wings together along a haul-in path passing between the said door stanchions; said method comprising:
 (a) trawling with the trawl net assembly until it is desired to haul in the net;
 (b) hauling in the towing warps on their respective said towing warp winch means until the said doors are in the vicinity of the respective said door stanchions;
 (c) slackly connecting hauling line means between said net winch means and respective juncture points in the divergent section;
 (d) tensioning said hauling line means and transferring at least the codend load from portions of the trawl net assembly forwardly of the said juncture points to the said hauling line means and thereby bypass the said towing warps and doors insofar as concerns bearing of at least the codend load; the said juncture points being situated aft of the said doors at locations inaccessible from on board the trawler at the time of transfer of at least the said codend load from portions of the trawl net assembly situated forwardly of said juncture points, and sufficiently aft of the doors to enable slackening of the portions of the trawl net assembly forwardly of the said juncture points after the said hauling line means are tentioned, the components of the said divergent section aft of the said juncture points being thereby re-oriented from an initial forwardly diverging attitude to an attitude wherein they are substantially brought together and oriented along the said haul-in path between said door stanchions;

(e) rotating the said single, separately operable net winch means until the said hauling line means and at least a part of the net are wound thereon.

2. A method according to claim 1, comprising disconnecting the portions of the trawl net assembly aft of the said juncture points from the remainder of the trawl net assembly, the trawl doors and the towing warps after transfer of the codend load to the said hauling line means and prior to completion of the winding of the said hauling line means and at least a part of the net onto the said net winch means.

3. A method according to claim 1, wherein the said juncture points are substantially at the forward ends of the said wings.

4. A method according to claim 1, wherein the said trawler is also equipped with a stern ramp, the said door stanchions are situated on opposite sides of the trawler forwardly of at least the after port of the ramp, and the method further comprises hauling the net up the stern ramp and aboard the trawler by the hauling line means and the single net winch means.

5. Apparatus for hauling in a trawl net aboard a trawler rigged with a trawl net assembly including at least a codend and a divergent section including wings extending forwardly therefrom, and which is towed during trawling by a set of towing warps extending aft from the trawler to the trawl net assembly, which set of towing warps is provided with trawl doors ahead of the wings to spread the wings divergently as they lead forwardly, said apparatus comprising;

(a) a pair of separate, horizontally spaced stanchions for the said doors;

(b) separately operable first and second towing warp winch means for hauling in the respective towing warps along generally divergent haul-in paths;

(c) a single, separately operable net winch means situated to haul in hauling line means and those portions of the trawl net assembly aft of the juncture points together along a haul-in path between said door stanchions; and (d) hauling line means riggable between said net winch means and juncture points in the divergent section at locations which are inaccessible from on board the trawler when the doors are in the vicinity of the stanchions and it is desired to transfer at least the codend load from the forward portions of the trawl net assembly to said hauling line means, said juncture points being sufficiently aft of the doors so that the portions of the trawl net assembly which extend forwardly of said juncture points can be slackened after the hauling line means are tensioned, so that the towing warps and the said doors are bypassed insofar as concerns the bearing of at least the codend load, the said hauling line means and the portions of the trawl net assembly which are situated aft of the said juncture points operate to then bear at least the codend load, and the components of the divergent section which are situated aft of said juncture points are re-oriented from an initial divergent attitude to an attitude wherein they are substantially brought together and oriented along said haul-in path between said door stanchions and remain in such orientation while the said hauling line means and at least some of the net wings are wound onto the said net winch means.

6. Apparatus according to claim 5, wherein the said juncture points comprise eye means situated substantially at the forward ends of the wings.

7. Apparatus according to claim 5, further including a ramp at the stern of the trawler forming a part of the said haul-in path between said stanchions, and wherein the said hauling line means connected to said net winch means lead aft over the ramp and to juncture points in the divergent section.

8. Apparatus according to claim 5, wherein said trawl net assembly includes a leg line led from the vicinity of the associated door to the associated juncture point during trawling, and said hauling line means includes lazy line means connected at its after end to the associated juncture point and is slackly connected at its forward end in the vicinity of the said door during trawling.

9. Apparatus according to claim 8, wherein the said lazy line comprises hook means at its forward end, by means of which it can be disconnected from the vicinity of the said door and connected to form at least a portion of said hauling line means.

10. Apparatus according to claim 8, wherein the said leg line comprises hook means at its connection to the said associated juncture point in order to permit disconnection of the leg line from the juncture point after the juncture point is made accessible from on board the trawler by hauling in the hauling line means.

References Cited by the Examiner

UNITED STATES PATENTS

| 1,601,893 | 10/1926 | Vigneron | 43—9 |
| 1,863,989 | 6/1932 | Liisanantti | 43—8 |
| 2,555,676 | 6/1951 | Clark | 43—8 X |
| 2,579,787 | 12/1951 | Burney | 43—8 |
| 2,583,929 | 1/1952 | Clark | 114—.5 |

FOREIGN PATENTS

| 628,148 | 6/1927 | France. |
| 240,083 | 9/1925 | Great Britain. |

SAMUEL KOREN, *Primary Examiner.*

W. H. CAMP, *Assistant Examiner.*